(12) United States Patent
Bogle

(10) Patent No.: US 8,397,904 B2
(45) Date of Patent: Mar. 19, 2013

(54) BELT CONVEYORS AND METHODS FOR CONVEYED PRODUCTS UNDERGOING A THERMAL TREATMENT

(75) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/442,991

(22) Filed: Apr. 10, 2012

(65) Prior Publication Data

US 2012/0217138 A1     Aug. 30, 2012

Related U.S. Application Data

(63) Continuation of application No. PCT/US2010/052156, filed on Oct. 11, 2010.

(60) Provisional application No. 61/251,423, filed on Oct. 14, 2009.

(51) Int. Cl.
*B65G 43/00* (2006.01)
(52) U.S. Cl. ............... 198/810.04; 198/810.01; 198/850
(58) Field of Classification Search .......... 198/850–853, 198/810.01, 810.04
See application file for complete search history.

(56) References Cited

U.S. PATENT DOCUMENTS

| | | | |
|---|---|---|---|
| 4,061,222 A | 12/1977 | Rushing | |
| 4,167,585 A | 9/1979 | Caradis et al. | |
| 4,263,254 A | 4/1981 | Huling | |
| 4,693,902 A | 9/1987 | Richmond et al. | |
| 4,801,466 A | 1/1989 | Clyne et al. | |
| 4,801,886 A | 1/1989 | Steininger | |
| 4,841,457 A | 6/1989 | Clyne et al. | |
| 5,179,265 A | 1/1993 | Sheridan et al. | |
| 5,750,174 A | 5/1998 | Lucassen | |
| 6,480,699 B1 * | 11/2002 | Lovoi | 455/41.2 |
| 7,494,004 B2 * | 2/2009 | Stolyar et al. | 198/810.04 |
| 7,635,060 B2 * | 12/2009 | Lagneaux | 198/810.04 |
| 2004/0187707 A1 | 9/2004 | Nielsen et al. | |
| 2005/0003064 A1 | 1/2005 | Hansen | |
| 2005/0109587 A1 * | 5/2005 | Best et al. | 198/810.01 |
| 2006/0070851 A1 | 4/2006 | Marisy et al. | |
| 2006/0243071 A1 | 11/2006 | Sagi-Dolev | |
| 2007/0222612 A1 * | 9/2007 | Krisl | 340/572.8 |
| 2008/0142044 A1 | 6/2008 | David | |
| 2008/0163608 A1 | 7/2008 | Yacoub | |
| 2009/0135019 A1 * | 5/2009 | Smith | 198/810.01 |
| 2009/0194391 A1 * | 8/2009 | Lagneaux | 198/853 |

OTHER PUBLICATIONS

ISA/US, International Preliminary Report on Patentability, PCT/US2010/052156, mailed Apr. 26, 2012, USPTO, Alexandria, VA.

* cited by examiner

*Primary Examiner* — James R Bidwell
(74) *Attorney, Agent, or Firm* — James T. Cronvich

(57) ABSTRACT

An environmentally controlled conveyor system including a sensor-instrumented conveyor belt conveying products continuously through a thermal-treatment process and a method for determining the instantaneous position of the sensors. Temperature or other sensors are embedded in the conveyor belt across its width and along its length to advance with the product through the thermal-treatment process, such as through a pasteurizer tunnel. The sensor measurements are transmitted wirelessly from the belt to a remote system controller for monitoring or controlling the system. Data from sensors measuring environmental or belt conditions are used to determine the instantaneous positions of the sensors to coordinate the sensor data with sensor position.

35 Claims, 4 Drawing Sheets

BELT CONVEYORS AND METHODS FOR CONVEYED PRODUCTS UNDERGOING A THERMAL TREATMENT

CROSS REFERENCE TO RELATED APPLICATIONS

This application is a continuation of co-pending International Patent Application No. PCT/US10/52156, filed Oct. 11, 2010, which is a non-provisional application of U.S. Provisional Patent Application No. 61/251,423, filed Oct. 14, 2009. The disclosures of both applications are incorporated into this application by reference.

BACKGROUND

The invention relates generally to power-driven conveyors and more particularly to conveyors with sensor-instrumented belts advancing with conveyed products undergoing a thermal treatment, such as pasteurizing, warming, or cooling.

Conveyor belts are commonly used to convey products through pasteurizers, warmers, coolers, freezers, and other equipment that subjects the products to a heat-treatment process. These processes are often monitored by sensors, such as temperature sensors, located at fixed positions within an enclosure through which the conveyor runs. In some instances, an operator takes manual readings at various spots in the enclosure with a handheld sensor. In either case, the sensor readings are taken at relatively few fixed positions not necessarily close to the conveyed products. Consequently, they can provide only imprecise estimates of the actual heat treatment the products are undergoing.

SUMMARY

This shortcoming is addressed by a conveyor belt embodying features of the invention. One version of such a conveyor belt conveying products being subjected to a thermal treatment comprises a temperature sensor and a co-located transmitter. The temperature sensor is embedded in the conveyor belt in a material having a thermal response related by a functional relationship to the thermal response of the conveyed products. The temperature sensor makes temperature measurements, which the transmitter transmits from the conveyor belt.

In another aspect of the invention, an environmentally controlled conveyor system embodying features of the invention comprises a conveyor belt conveying products continuously through the conveyor system. A temperature sensor making temperature measurements advances through the conveyor system as he same speed as the products. The sensor is embedded in a material having a thermal response related by a predetermined functional relationship to the thermal response of conveyed products being subjected to a thermal treatment. A transmitter co-located with the temperature sensor transmits the temperature measurements. A receiver remote from the conveyor belt receives the temperature measurements transmitted by the transmitter and the conveyor belt. A controller coupled to the receiver processes the temperature measurements and controls the temperature of the conveyor system or the speed of the conveyor belt as a function of the temperature measurements.

In another aspect of the invention, a conveyor system embodying features of the invention and conveying products continuously through a thermal treatment comprises a conveyor belt conveying products continuously through the conveyor system. Temperature sensors advancing through the conveyor system at the same speed as the products have a thermal response related by a predetermined functional relationship to the thermal response of conveyed products being subjected to a thermal treatment. The temperature sensors make temperature measurements. The system also comprises means for determining a condition of the products in the vicinity of each temperature sensor from the temperature measurements and the predetermined functional relationship. A transmitter co-located with each of the temperature sensors transmits the temperature measurements or the conditions of the products. A receiver remote from the conveyor belt receives the temperature measurements or the conditions of the products from the transmitter.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
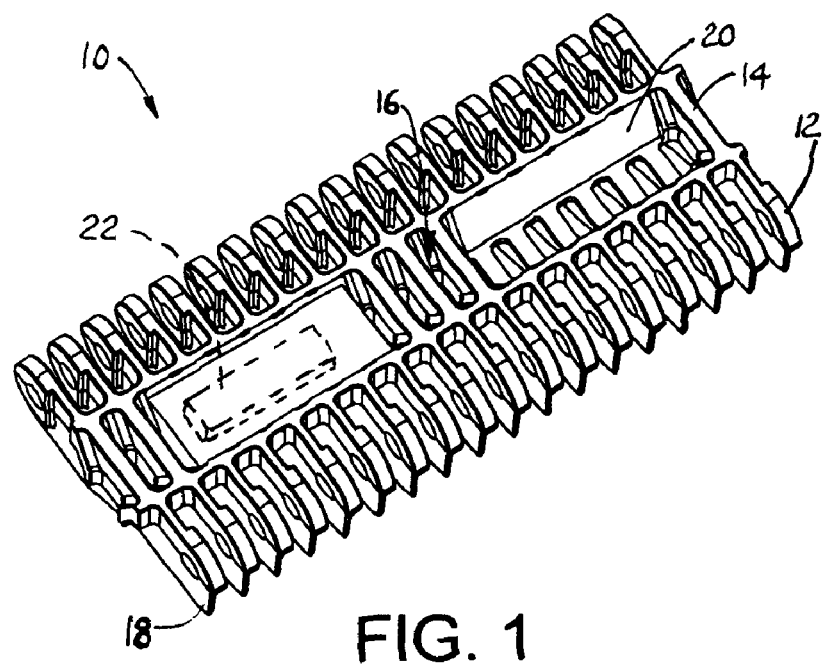
FIG. 1 is a bottom isometric view of a conveyor belt module embodying features of the invention for use in a pasteurizer.
Figure 3:
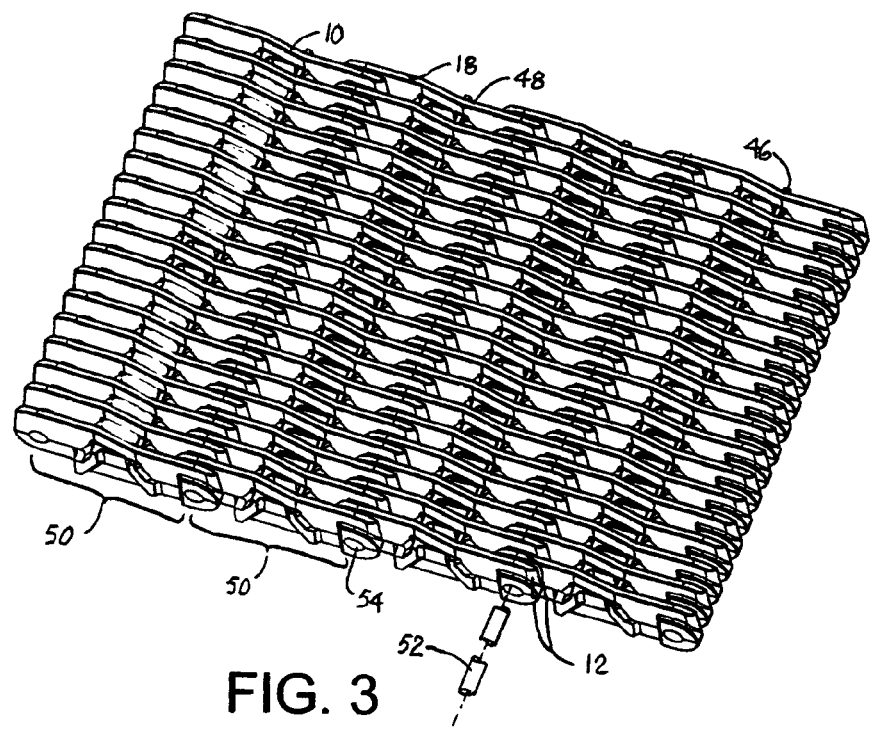
FIG. 3 is an isometric view of a portion of a conveyor belt constructed of belt modules, including belt modules as in FIG. 1.

An instrumented conveyor belt module embodying features of the invention is shown in FIG. 1. The base belt module 10 is an injection-molded plastic module made out of a thermoplastic polymer, such as polyethylene, polypropylene, acetal, or a composite polymer. Hinge eyes 12 on each end of the module extend outward in opposite directions from an intermediate section 14 of the module. The hinge eyes on one end are laterally offset from those on the other end so that the modules can be connected end to end and side by side with other similar modules into a modular conveyor belt (FIG. 3). The intermediate section 14 of the belt module 10 includes drive pockets 16 that receive the teeth of drive sprockets to drive a belt constructed of the modules. FIG. 1 shows the module with its driven side up. The opposite conveying side faces down in FIG. 1 and includes narrow raised ribs 18 running from one end of the module to the other from the hinge eyes on one end to the hinge eyes on the opposite end. As better shown in FIG. 3, the raised ribs jog laterally in the intermediate section because of the lateral offset of the hinge eyes on each end of the module. The intermediate section also has large cavities 20. Except for the cavities, the module shown is identical to the Intralox®Series 400 Raised Rib belt module manufactured and sold by Intralox, L.L.C. of Harahan, La., U.S.A.

Figure 2:
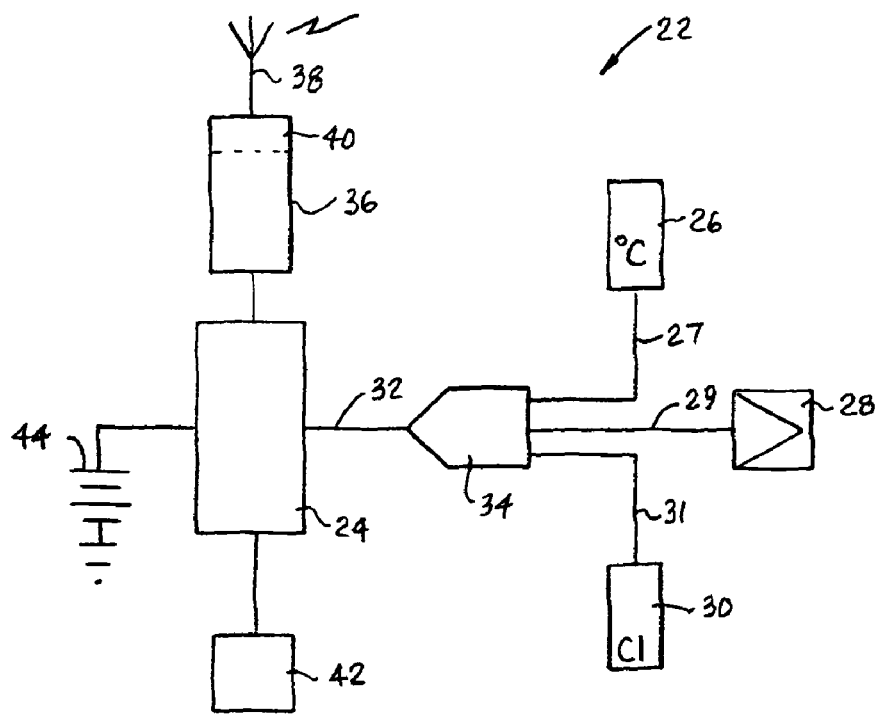
FIG. 2 is a block diagram of sensor components embedded in a belt module as in FIG. 1.

The cavities 20 serve as receptacles for a sensor pack 22 that includes some or all of the components shown in FIG. 2. The sensor-pack components include a processor 24, such as a microcontroller, and one or more sensors, such as a temperature sensor 26, a load, or belt-tension, sensor 28, and a chemical sensor 30. Each of the sensors outputs an analog signal 27, 29, 31 representing the condition being sensed. The analog signals are sampled periodically and converted to digital samples 32 in an analog-to-digital converter 34. The analog-to-digital conversion can take place within the sensors themselves, within the controller, or in a separate analog-to-digital converter with multiplexed inputs. The controller sends the digital samples as received or processes them before sending them to a transmitter 36 for wireless transmission off the module via an antenna 38. The transmitter may also include a receiver 40 to receive incoming transmissions from a remote transmitter and send them to the controller 24. A memory element 42 connected to the controller 24 may be used to log sensor measurements so that a series of stored measurements can be transmitted remotely at one time when the sensor is close to a remote receiving antenna or to lower the duty cycle of the transmitter. All the electronic components in the pack 72 are powered by a power supply, such as a battery 44.

The temperature sensor 26 may be a thermocouple, a thermistor, an RTD, or other temperature-sensing device. The load sensor 28 may include one or more strain gauges appropriately arranged in the system with their outputs combined to produce a composite signal representing belt tension or with individual outputs sent to the controller 24 or remotely for computing the resulting belt tension. The chemical sensor 30 may sense pH and oxidation reduction potential to indicate the presence of certain chemicals. By sensing these conditions, the chemical sensor indirectly senses the concentration of certain chemicals that cause those conditions. For example, the chemical sensor may be a halogen sensor or, more particularly, a bromine or chlorine sensor that indirectly senses the concentration of bromine or chlorine ions that can attack the plastic conveyor belt, especially at elevated temperatures. But a sensor dedicated to sensing chlorine or bromine directly could be used as well. And the chemical sensor could be temperature-compensated.

The sensor pack 22 with the co-located sensors and electronic components is embedded in a cast polymer material that fits in the cavities 20 in the module 10. The packs are retained in the cavities by a welded or snap-in cover or by snap-in structure in the module and on the pack. As another alternative, the sensor pack may be co-molded with the belt module. Especially for use in a pasteurizer or other critical thermal process, the temperature sensor is encapsulated in a potting material that preferably has the same thermal conductivity as the products being pasteurized or is related by a known function. The potting material could be the cast polymer material the surrounds all the sensors and fills the cavities or it could be a material local to the temperature sensor in a void in the cast polymer material. The thermal response of the encapsulated temperature sensor, which is determined by the thermal conductivity of the potting material and its shape around the temperature sensor, is preferably chosen to match or relate in a known way to the thermal response of the products. (Masterbond, Inc. of Hackensack, N.J., U.S.A. manufactures and sells a large variety of potting and encapsulation materials that may be tailored to provide the desired thermal characteristics.) In this way, the temperature $T_s$ detected by the sensor matches, or is related to, the actual temperature $T_a$ of the products by a predetermined function F, giving $T_a = F(T_s)$. The functional relationship F may be described by a constant, or scalar k, in which case $T_a = kT_s$, or a time delay, as examples. The controller 24 could also be programmed to compute pasteurization units (PU's) in a pasteurizer and transmit those values remotely for monitoring the process. The sensor packs could be made replaceable and potted in materials having different thermal conductivities to match different products. Furthermore, the sensors could be mounted in one or more separate belts that advance in parallel with and at the same speed as the conveyor belt carrying the products.

As shown in FIG. 3, a modular plastic conveyor belt 46 is constructed of one or more belt modules, including sensor modules 10 and perhaps standard sensorless modules 48, such as Intralox® Series 400 Raised Rib modules. The modules are preferably linked together end to end and side by side into a series of rows 50. The hinge eyes 12 of consecutive rows are interleaved with a hinge rod 52 inserted into the aligned openings 54 in the interleaved hinge eyes to connect the rows together at the hinge eyes into an endless conveyor belt. Although a modular plastic belt is preferred for use in the disclosed process, other kinds of chains or belts, such as metal belts, flat belts, and chain or slat conveyors, for example, may be used in the process or in similar processes.

The instrumented conveyor belt is used to convey products, such as beer bottles or cans 56, continuously through a temperature-treatment process, such as a pasteurization process. The simplified pasteurizer system 58 shown comprises a pre-heating zone A, a pre-pasteurization zone B, a pasteurization zone C, and a cooling zone D in a pasteurizer tunnel. Each zone includes a tub 60 and a sprayer 62. The conveyor belt 46 conveys the products through the tunnel in a conveying direction 64. The conveyor belt is trained around drive and idle sprockets 66, 67 at discharge and infeed ends of the tunnel. The drive sprockets are mounted on shafts driven by a drive motor 68. As the products are conveyed through the pasteurizer, the sprayers 62 spray water at selected temperatures onto the products. The water dripping from the products and the conveyor belt is collected in the tubs for recirculation.

Figure 5:
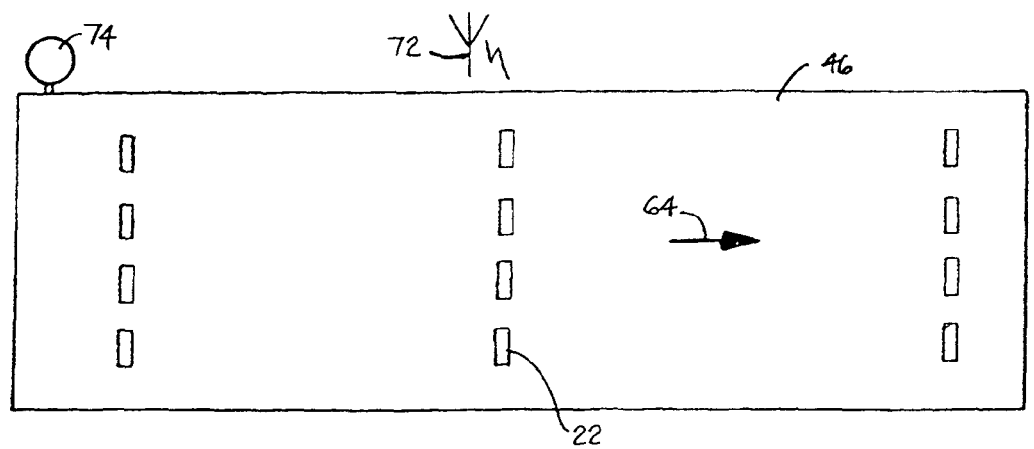
FIG. 5 is a top plan schematic of the conveyor belt of FIG. 3 in the pasteurizer of FIG. 4.
Figure 6:
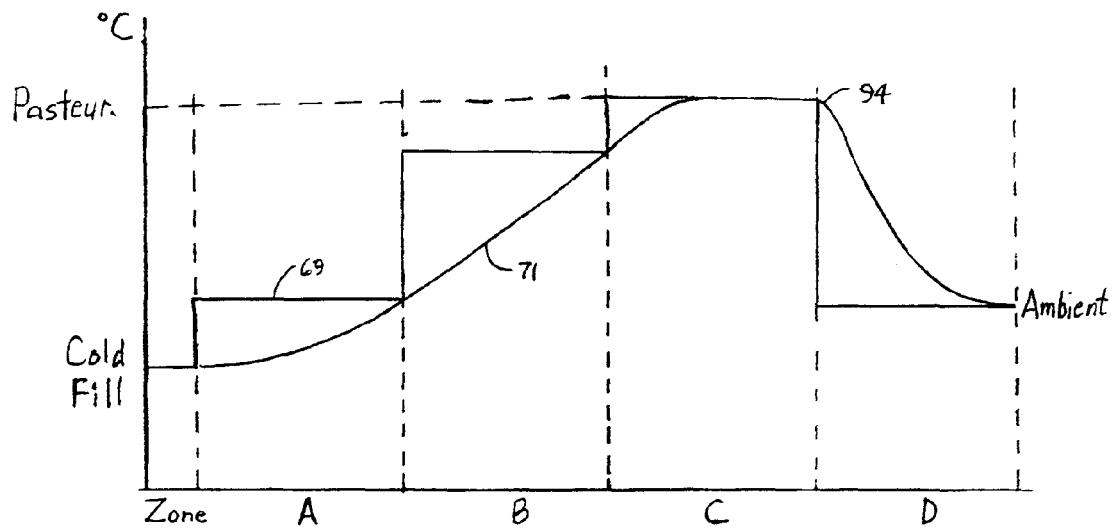
FIG. 6 is a graph of an exemplary temperature profile in a pasteurizer as in FIG. 4.

As indicated by the example graph in FIG. 6, the products are subjected to a preselected heat treatment in the pasteurizer. The temperature of the spray water in each zone is represented by a stepped function 69. A smooth curve 71 represents the temperature measured by one of the temperature sensors embedded in the sensor packs 22 at locations along the length and width of the belt 46, as shown in FIG. 5, as it advances in the conveying direction 64 along the upper carryway. Because the sensors are embedded in the belt, they move with the products and undergo the same heat treatment as nearby products. In the pre-heating zone A, the products are heated by the sprayed water to a temperature above the cold-fill temperature. In the pre-pasteurization zone B, the products are heated to a temperature just below the pasteurization temperature. In the pasteurization zone C, the water is sprayed on the products at a temperature necessary to maintain the products at the pasteurization temperature. Finally, the products are sprayed with cooler water in the cooling zone D to lower their temperatures to ambient temperature and stop the pasteurization process.

Figure 4:
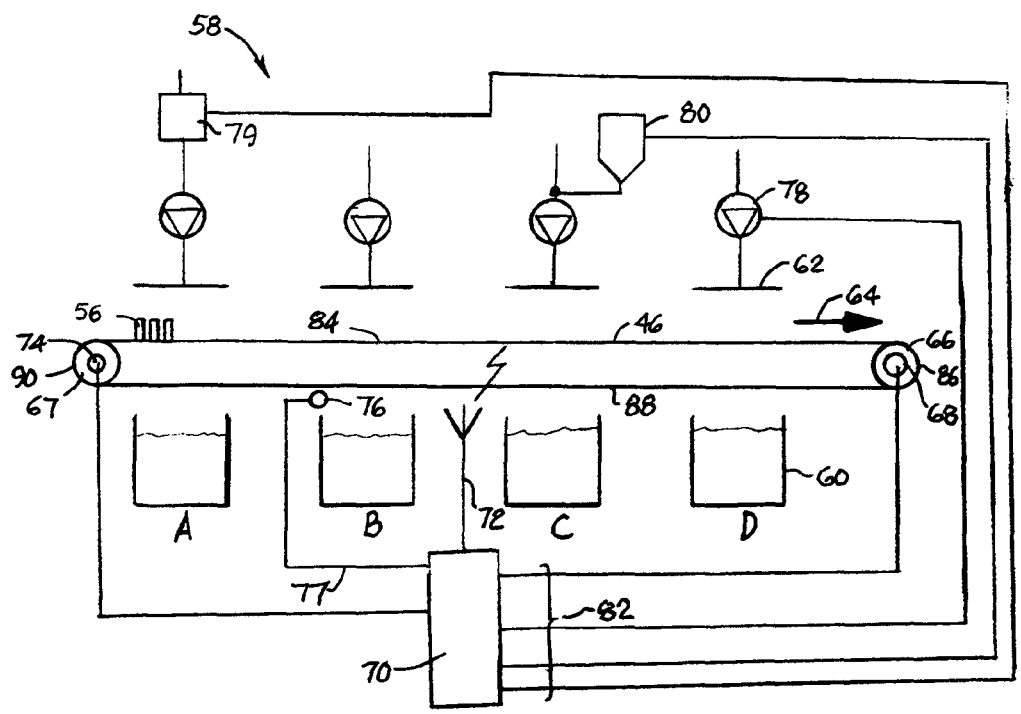
FIG. 4 is a schematic of a pasteurizer system embodying features of the invention, including the conveyor belt of FIG. 3.

Because the temperature sensors advance with the products and because the temperature sensors are embedded in a material whose thermal conductivity matches or is functionally related to the thermal conductivity of the products, an accurate representation of the thermal treatment of products in the vicinity of the thermal sensors may be derived by the controller 24 in each sensor pack 22 or by a remote system controller 70, as shown in FIG. 4. The system controller 70 includes a receiver and a transmitter for receiving data and sending commands or data to the sensor in the belt 46 via an antenna 72. The system controller 70 may also receive data from other sensors remote from the conveyor belt. A tachometer or shaft encoder 74 mounted to the idle shaft of the conveyor belt sends a signal 75 that allows the system controller to determine the speed of the positively driven belt. Chemical sensors 76 mounted at strategic locations in the pasteurizer and sensitive to certain chemicals may be used to send signals 77 representing chemical concentrations to the system controller 70. The off-belt sensor signals and the sensor measurements sent wirelessly from the belt may be displayed to plant operators so that they can manually adjust the process as required or may be used to automatically control the speed or starting and stopping of the drive motor 68, the flow of water to each of the sprayers 62 via valves 78, the temperature of the spray water via heat exchangers 79, or the concentration of chemicals added to the water from a dispenser 80. For example, the concentration of chlorine in the spray water can be decreased as the temperature rises to offset the increasing reactivity of chlorine with temperature. The system controller outputs control signals over signal lines 82 to provide closed-loop control of various pasteurizer variables.

In the case of a pasteurizing system, the PU's received by the products in the vicinity of each temperature sensor can be computed by the individual controllers 24 or by the system controller 70. Because the products are closely positioned to an associated temperature sensor, the PU's computed from each sensor's temperature measurements will produce a good estimate of the PU's actually received by the nearby products. Products such as beer bottles or cans have a cold spot along the central axis of the bottle just above the bottle or can's bottom. The cold spot is the low-temperature spot in the bottle or can. It is important that the cold spot receive the minimum PU's to ensure adequate pasteurization of the beer. The thermal response of the cold spot is what is functionally related to the thermal response of the temperature sensor embedded in its potting material. Thus, the controller computes an estimated cold-spot temperature $T_{cs}$ for the bottles or cans associated with each temperature sensor from the sensor measurement $T_s$ according to $T_{cs}=F(T_s)$, where F is the functional relationship between the thermal conductivity of the temperature sensor and the bottles or cans. The standard PU formula is given by $PU=t \times 10^{(T-T_b)/Z}$, where t is the time in minutes, T is the temperature in ° C. (in this case $T_{cs}$), $T_b$ is the base temperature (for example, 60° C.), and Z is the temperature increase required to produce a ten-fold increase in kill rate (for example, 7° C.). Thus, the formula becomes $PU=t \times 10^{(T_{cs}-60)/7}$. If, for example, the sensors take measurements every 10 seconds, i.e., every ⅙ minute, the iterative algorithm $(PU=PU+\frac{1}{6}(10^{(T_{cs}-60)/7}))$ computes the accumulation of PU's every 10 seconds at the cold spot in each of the bottles in the vicinity of the temperature sensor. Of course, the temperature sensors could be related to temperatures at other spots in the bottles or cans or to some sort of bottle or can average instead of to the cold spot.

As shown in FIG. 4, the belt-mounted sensors advance with the belt 46 through the pasteurizer along a closed belt path that includes an upper carryway run 84, a first reversal 86 at the drive sprockets 66, a lower return run 88, and a second reversal 90 at the idle sprockets 67. Because the sensors are moving with the conveyor belt, their measurements are more meaningful when the position of the sensor along the belt path at the time of each measurement is known. This can be achieved through the use of dedicated position sensors in the belt, for example. But it is also possible to determine the position of the sensors from the measurements provided by the load sensors or the temperature sensors and a priori knowledge of the tension characteristics of the belt or the thermal characteristics of the pasteurizer.

Figure 7:
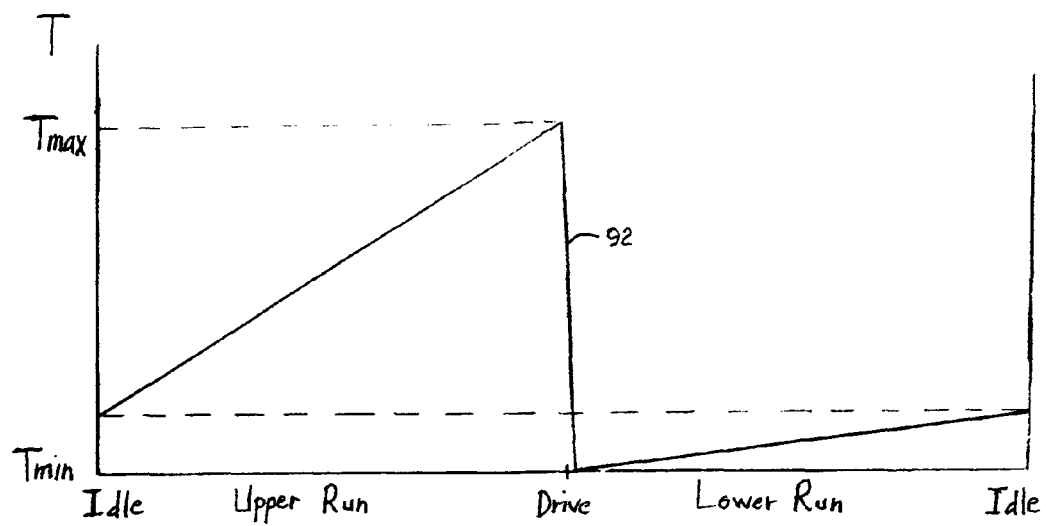
FIG. 7 is a graph of an ideal profile of belt tension in the conveyor belt of FIG. 3.

The tension characteristics of the conveyor belt along the closed belt path are shown in FIG. 7. (The characteristics are idealized for simplicity.) The belt tension T is greatest $T_{max}$ at the position of the drive sprockets and decreases rapidly opposite to the direction of belt travel along the upper run, which is typically loaded with products. On the unloaded lower return run, past the idle sprockets, the tension decreases much more gradually to a minimum tension $T_{min}$ just after the exit of the belt from the drive sprockets. The abrupt change 92 in tension at the drive sprockets, indicated by the steep negative slope in the graph, represents a salient measurable attribute at a known predetermined position (the position of the drive sprocket) along the belt path. From the load sensor's measurement samples received from the sensor pack in real time or time-stamped, the system controller can compute the time the load sensor passed the drive sprockets. The system controller uses the speed of the conveyor belt, as measured by the encoder 74, and a priori knowledge of the length of the conveyor belt and the layout of the pasteurizer to determine, by dead reckoning, the instantaneous position of the sensor along the conveying path. Thus, the system uses a sensor measuring a belt condition—and not position directly—to determine the sensor's instantaneous position along the belt path.

It is also possible to use the output of the temperature sensors in the belt to determine their positions. For example, as shown in the temperature profile of the pasteurizer in FIG. 6, the drop in temperature 94 as the belt enters the cooling zone D represents a salient environmental attribute that can be determined from the temperature sensor's measurements. The system can then determine the instantaneous position of the sensors by dead reckoning from the entrance to the cooling zone D.

Some of the benefits of having a number of sensors embedded in the belt across its width and along its length include:
more accurate determination of PU's across the width of the belt for fine-tuning the pasteurization process; and
better detection of problems, such as clogged sprayer headers, uneven belt loads, too much catenary sag in the belt, loose belt tension, surging, roller bearing wear, and high chemical concentrations.

Figure 8:
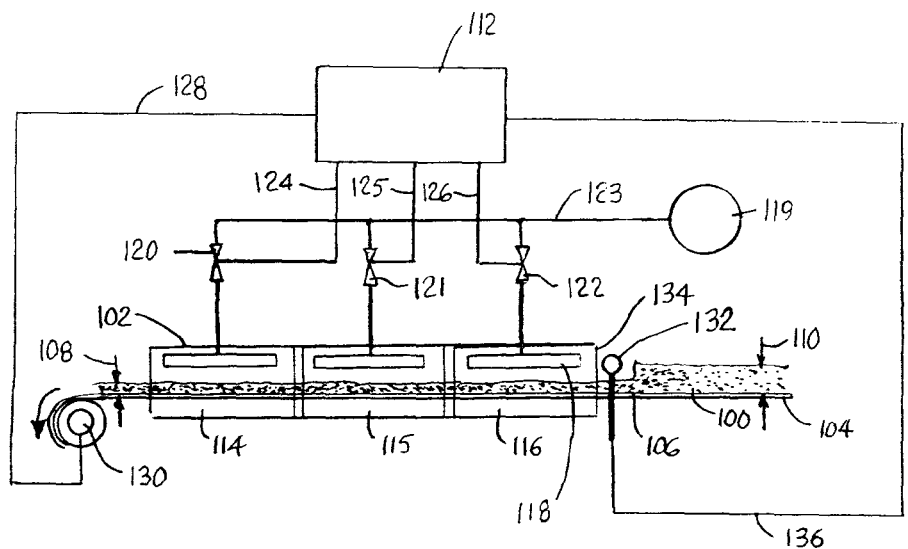
FIG. 8 is a part pictorial, part block diagram illustration of a blanching system embodying features of the invention, including a conveyor belt as in FIG. 3.

In pasteurizing, the density of bottles or cans passing through on the conveyor belt is generally constant. In vegetable blanchers, however, product density can vary along the length of the conveyor. As shown in FIG. 8, a mat of product 100, such as raw vegetables, is conveyed into a blancher 102 or other heat-treatment chamber atop a conveyor belt 104, such as a conveyor belt as in FIG. 5. The product load is shown with a step change in the depth of the product mat at a position 106 along the conveyor belt's path. In this example, the product mat has a lower depth 108 downstream of the position 106 and a greater depth 110 upstream. The controller in the pasteurizer uses an algorithm to compute pasteurization units from temperature measurements and to adjust the process by controlling process variables such as belt speed, water flow rates, and spray-water temperature. Similarly, a controller 112 associated with the blancher 102 can be used to adjust its operation in response to the temperature readings and to variations in product loading. For example, the blancher 102 is shown having a series of partially or completely isolated blanching zones 114-116 along its length. Each zone has a steam manifold 118. The amount of steam emitted by each manifold is regulated by an associated valve 120-122. The valves are supplied with steam from a steam source 119 through a steam pipe 123. The controller 112 controls the valves over control lines 124-126 and the belt speed over a motor control line 128 connected to a drive motor 130. An algorithm is executed by the controller to control belt speed and steam emission in each zone to achieve desired blanching results. But to achieve the same results for a deep product mat as for a shallow product mat may require a different algorithm. A product-load sensor 132 near the entrance end 134 of the blancher 102 senses the product load by sensing its depth, its weight, or its density. For measuring depth, a photo eye or other optical sensor, a proximity sensor, or a flapper with a belt sensor or with a rheostat, potentiometer, or angle encoder on its pivot shaft could be used. Alternative load sensors include scales or weight sensors to weigh the product load and visioning systems to determine product density or depth. The product-load sensor 132 sends a load signal 136 to the controller 112. When the controller detects a change in product load, it can adjust the steam outputs in each blancher zone 114-116 according to the blanching algorithm appropriate for product mats of the changed depth. In this way, the controller, using a first algorithm for the shallow or light product mat and a second algorithm for the deep or heavy product mat, compensates for variations in product load to uniformly cook the products. This kind of load compensation could also be applied to batch processing.

Although the invention has been described in detail with reference to a preferred version, one skilled in the art would appreciate that the invention is adaptable to other kinds of continuous heat-treatment processes. Consequently, the scope of the claims is not meant to be limited to the details of the exemplary version used to disclose the invention.

What is claimed is:

1. A conveyor belt for conveying products being subjected to a thermal treatment, the conveyor belt comprising:
    a temperature sensor embedded in the conveyor belt in a material having a thermal response related by a predetermined functional relationship to the thermal response of conveyed products being subjected to a thermal treatment, wherein the temperature sensor makes temperature measurements;
    wherein the thermal response of the material matches the thermal response of the conveyed products so that the predetermined functional relationship is given by a scalar;
    a transmitter co-located in the conveyor belt with the temperature sensor and transmitting the temperature measurements from the conveyor belt.

2. A conveyor belt as in claim 1 further comprising a battery co-located with the temperature sensor and the transmitter to power the temperature sensor and the transmitter.

3. A conveyor belt as in claim 1 wherein the material is a cast polymer.

4. A conveyor belt as in claim 1 wherein the conveyor belt is a modular plastic conveyor belt comprising a series of rows of one or more conveyor belt modules hingedly linked together end to end into an endless belt loop.

5. A conveyor belt as in claim 4 comprising a plurality of the temperature sensors mounted at spaced apart locations across the width of selected rows of belt modules.

6. A conveyor belt as in claim 1 further comprising means for computing pasteurizer units from the temperature measurements.

7. A conveyor belt as in claim 1 further comprising a memory element co-located with the temperature sensor for logging the temperature measurements.

8. A conveyor belt as in claim 1 further comprising a chemical sensor mounted in the belt for making chemical concentration measurements of a specified chemical.

9. A conveyor belt as in claim 8 further comprising a transmitter co-located with the chemical sensor to transmit the chemical concentration measurements from the conveyor belt.

10. A conveyor belt as in claim 1 further comprising a load sensor mounted in the belt for making measurements of belt tension.

11. A conveyor belt as in claim 10 further comprising a transmitter co-located with the load sensor to transmit the measurements of belt tension from the conveyor belt.

12. A conveyor belt as in claim 1 comprising a plurality of the temperature sensors and further comprising a plurality of tension sensors mounted throughout the length and width of the conveyor belt for taking measurements of temperature and belt tension.

13. A conveyor belt as in claim 1 further comprising a recess and wherein the temperature sensor and the transmitter are mounted together in a pack that is insertable into the recess.

14. A conveyor belt for conveying products being subjected to a thermal treatment, the conveyor belt comprising:
    a temperature sensor embedded in the conveyor belt in a material having a thermal response related by a predetermined functional relationship to the thermal response of conveyed products being subjected to a thermal treatment, wherein the temperature sensor makes temperature measurements;
    a transmitter co-located in the conveyor belt with the temperature sensor and transmitting the temperature measurements from the conveyor belt; and
    means for computing pasteurizer units from the temperature measurements comprising a processor co-located with the temperature sensor and the transmitter in the conveyor belt.

15. A conveyor belt as in claim 14 wherein the thermal response of the material matches the thermal response of the conveyed products so that the predetermined functional relationship is given by a scalar.

16. An environmentally controlled conveyor system for subjecting continuously conveyed products to a thermal treatment, the conveyor system comprising:
    a conveyor belt conveying products continuously through the conveyor system;
    a temperature sensor advancing through the conveyor system at the same speed as the products and having a thermal response matching the thermal response of conveyed products being subjected to a thermal treatment, wherein the temperature sensor makes temperature measurements;
    a transmitter co-located with the temperature sensor and transmitting the temperature measurements;
    a receiver remote from the conveyor belt for receiving the temperature measurements from the transmitter;
    a controller coupled to the receiver for processing the temperature measurements and controlling the temperature of the conveyor system or the speed of the conveyor belt as a function of the temperature measurements.

17. A conveyor system as in claim 16 wherein the controller computes pasteurization units from the temperature measurements.

18. A conveyor system as in claim 16 wherein the temperature sensor is embedded in the conveyor belt.

19. A conveyor system as in claim 16 wherein the conveyor belt further includes a load sensor making measurements of belt tension and wherein the transmitter transmits the measurements of belt tension to the receiver for monitoring by the controller.

20. A conveyor system as in claim 19 wherein the controller determines the instantaneous position of the load sensor from the measurements of belt tension.

21. A conveyor system as in claim 16 wherein the controller determines the instantaneous position of the temperature sensor from the temperature measurements.

22. A conveyor system as in claim 16 further comprising a series of treatment zones through which the conveyor belt conveys the products along the conveyor system, wherein the controller controls the temperature independently in each of the treatment zones.

23. A conveyor system as in claim 16 further comprising a product-load sensor measuring the product load on the conveyor belt and sending a load signal to the controller.

24. A conveyor system as in claim 23 wherein the controller executes a first control algorithm to control the conveyor system for light product loads and a second control algorithm to control the conveyor system for heavy product loads.

25. An environmentally controlled conveyor system for subjecting continuously conveyed products to a thermal treatment, the conveyor system comprising:
- a conveyor belt conveying products continuously through the conveyor system;
- a temperature sensor advancing through the conveyor system at the same speed as the products and having a thermal response related by a predetermined functional relationship to the thermal response of conveyed products being subjected to a thermal treatment, wherein the temperature sensor makes temperature measurements;
- a transmitter co-located with the temperature sensor and transmitting the temperature measurements;
- a receiver remote from the conveyor belt for receiving the temperature measurements from the transmitter;
- a controller coupled to the receiver for processing the temperature measurements and controlling the temperature of the conveyor system or the speed of the conveyor belt as a function of the temperature measurements;
- a chemical sensor making chemical concentration measurements of a certain chemical and wherein the controller computes the concentration of the certain chemical in the conveyor from the chemical concentration measurements.

26. A conveyor system as in claim 25 wherein the controller adjusts the concentration of the certain chemical according to the temperature measurements and the chemical measurements.

27. A conveyor as in claim 26 wherein the controller lowers the concentration of the certain chemical as the temperature rises.

28. A conveyor system conveying products continuously through a thermal treatment, the conveyor system comprising:
- a conveyor belt conveying products continuously through the conveyor system;
- a plurality of temperature sensors advancing through the conveyor system at the same speed as the products and having a thermal response related by a predetermined functional relationship to the thermal response of conveyed products being subjected to a thermal treatment, wherein the temperature sensors make temperature measurements;
- means for determining a condition of the products in the vicinity of each temperature sensor from the temperature measurements and the predetermined functional relationship, wherein the means for determining a condition of the products in the vicinity of each temperature sensor comprises a controller computing the condition from the temperature measurements;
- a transmitter co-located with each of the temperature sensors and transmitting the temperature measurements or the conditions of the products;
- a receiver remote from the conveyor belt for receiving the temperature measurements or the conditions of the products from the transmitter.

29. A conveyor system as in claim 28 wherein the controller is co-located with each of the position sensors.

30. A conveyor system as in claim 28 wherein the controller is remote from the conveyor belt, the controller computing the condition for the products in the vicinity of each temperature sensor from the temperature measurements transmitted by the transmitter and received by the receiver.

31. A conveyor system as in claim 28 wherein the controller controls the temperature of the conveyor system or the speed of the conveyor belt as a function of the temperature measurements.

32. A conveyor system as in claim 28 wherein the controller determines the instantaneous positions of the temperature sensors from the temperature measurements.

33. A conveyor system as in claim 28 wherein the means for determining a condition of the products in the vicinity of each temperature sensor computes pasteurization units from the temperature measurements.

34. A conveyor system as in claim 28 wherein the temperature sensors are embedded in the conveyor belt.

35. A conveyor system as in claim 28 wherein the temperature sensors are embedded in a material having a thermal response related by the predetermined functional relationship to the thermal response of conveyed products being subjected to a thermal treatment.

* * * * *